United States Patent
Golander et al.

(10) Patent No.: US 10,691,553 B2
(45) Date of Patent: Jun. 23, 2020

(54) PERSISTENT MEMORY BASED DISTRIBUTED-JOURNAL FILE SYSTEM

(71) Applicant: NETAPP, INC., Sunnyvale, CA (US)

(72) Inventors: Amit Golander, Tel-Aviv (IL); Boaz Harrosh, Tel-Aviv (IL); Sagi Manole, Petach-Tikva (IL)

(73) Assignee: NETAPP, INC., Sunnyvale, CA (US)

( * ) Notice: Subject to any disclaimer, the term of this patent is extended or adjusted under 35 U.S.C. 154(b) by 702 days.

(21) Appl. No.: 14/970,611

(22) Filed: Dec. 16, 2015

(65) Prior Publication Data

US 2017/0177447 A1 Jun. 22, 2017

(51) Int. Cl.
*G06F 16/18* (2019.01)
*G06F 11/14* (2006.01)

(52) U.S. Cl.
CPC .......... *G06F 11/1464* (2013.01); *G06F 11/14* (2013.01); *G06F 11/1471* (2013.01); *G06F 16/1815* (2019.01); *G06F 2201/80* (2013.01)

(58) Field of Classification Search
CPC .......... G06F 17/30191; G06F 11/1464; G06F 16/1815; G06F 11/14; G06F 11/1471; G06F 2201/80
USPC ........................................................ 707/648
See application file for complete search history.

(56) References Cited

U.S. PATENT DOCUMENTS

| | | | |
|---|---|---|---|
| 5,283,894 A | 2/1994 | Deran | |
| 5,870,757 A * | 2/1999 | Fuller | G06F 11/1471 |
| 5,937,425 A | 8/1999 | Ban | |
| 2006/0053139 A1 * | 3/2006 | Marzinski | G06F 11/1435 |
| 2013/0179400 A1 * | 7/2013 | Daly | G06F 16/27 707/631 |
| 2015/0249618 A1 * | 9/2015 | Golander | H04L 47/70 709/224 |
| 2017/0031783 A1 * | 2/2017 | Kedem | G06F 11/1451 |
| 2017/0177644 A1 | 6/2017 | Golander et al. | |

* cited by examiner

*Primary Examiner* — Hosain T Alam
*Assistant Examiner* — Saba Ahmed
(74) *Attorney, Agent, or Firm* — Klein, O'Neill & Singh, LLP

(57) ABSTRACT

A persistent memory based distributed-journal file system, comprising:
1) Direct mapped persistent memory unit hosting at least a subset of a file system which contains a plurality of files each associated with a metadata record and a self-journal record.
2) A memory storing a program code.
3) One or more processors coupled to the persistent memory unit and the memory for executing the program code which comprises:
   (a) Creating a resources dataset which maps characteristics of the file system by analyzing the files' metadata records.
   (b) Receiving an alteration request to alter altered file(s) of the plurality of files.
   (c) Determining if the alteration is an atomic alteration which is applied to the file system in an atomic operation.
   (d) Logging an indication of the alteration in the respective self-journal record of the altered file(s) for non-atomic alteration.
   (e) Applying the alteration in the file system.

24 Claims, 8 Drawing Sheets

PERSISTENT MEMORY BASED DISTRIBUTED-JOURNAL FILE SYSTEM

REFERENCES CITED

Materials incorporated by reference in this disclosure include the following:

This application is related to co-filed US Provisional Patent Application entitled "METHOD FOR EFFICIENT, PERSISTENT AND ATOMIC UPDATE OF B-TREE IN A MEMORY-BASED FILE SYSTEM" 62/267,951 by Amit GOLANDER, Boaz HARROSH and Sagi MANOLE.

BACKGROUND

The present invention, in some embodiments thereof, relates to creating a robust persistent memory based distributed-journal file system and, more specifically, but not exclusively, to creating a robust persistent memory based distributed-journal file system by allocating a self-journal record to each of the files in the file system.

Data storage is one of the major building blocks of modern technology as everything is about data. One of the challenges every data storage system, product and/or platform is facing is the need to provide a robust crash immune data management environment while maintaining high access rates and data store/retrieval performance. Crash immunity is essential in order to verify the consistency of a data storage system to assure data integrity and/or avoid data loss in the event of an improper unmounting of the data storage system as result of, for example, a system crash, a system hang and/or a power loss which may occur during one or more operations to the data storage system.

One of the widely used techniques for implementing a robust data management system is a journal based file system in which every file operation such as, for example, file creation, removal, modification, truncate, merge, split and/or link is logged in a dedicated record—a journal. Following an improper unmount sequence of the file system, the journal may be analyzed to determine which of one or more file operations that took place during the improper unmount sequence have completed successfully and which of the file operation(s) have not completed.

Analyzing the journal allows the file system to undo file operation(s) which did not complete during the improper unmount sequence and restore the file system to the initial state in which it was prior to initiation of the failed file operation(s). The data involving the failed file operation(s) may be lost but the integrity of the file system is maintained.

Journaling file systems however may present a performance penalty in modern multi-threaded processors, since the journal needs to be kept constantly synchronized, forcing every state-modifying file and/or directory operation to be logged in the journal, in the order it is executed. This scenario may make the journal logging itself a bottleneck in the data storage path. The performance penalty may have been acceptable while working with legacy mass storage devices, for example, magnetic hard drives and/or solid state drives and/or arrays, however the rapidly increasing performance of near-memory speed storage devices may require other solutions to address a robust file system which allows for high data access rates and/or performance.

SUMMARY

According to some embodiments of the present invention there is provided a persistent memory based distributed-journal file system comprising a direct mapped persistent memory, a memory storing a program code and one or more hardware processor coupled to the direct mapped persistent memory unit and the memory for executing the program code. The direct mapped persistent memory unit hosts at least a subset of a file system containing a plurality of files each associated with a respective one of a plurality of metadata records and a respective one of a plurality of self-journal records. The program code comprises code instructions to:

Create a resources dataset which maps a plurality of characteristics of the file system by analyzing the plurality of metadata records.

Receive an alteration request to alter one or more altered files of the plurality of files.

Determine if the alteration is an atomic alteration which may be applied to the file system in an atomic operation.

Log an indication of the alteration in the respective self-journal record associated with the one or more altered files in case the alteration is a non-atomic alteration.

Apply the alteration in the file system.

Each of the plurality of files is a member selected from a group consisting of a data file, a directory, a link to a file and/or a link to a directory.

The alteration is applied through one or more file operations. Each of the one or more file operations is a member selected from a group consisting of modify, create, link, write, mmap, remove, delete, unlink, merge, split, rename, truncate, append, concatenate and/or attribute change.

The subset includes the plurality of metadata records and the plurality of self-journal records.

Optionally, the respective self-journal record is incorporated within one or more objects of the file system. The file system object is a member selected from a group consisting of the respective metadata record, a respective inode of the associated file, a parent directory of the associated file and/or an ancestor directory of the associated file.

The atomic operation is atomic in a scope of portable operating system interface (POSIX) and is not interruptible by other operations to said file system.

The program code comprises code instructions to remove the indication from the respective self-journal record of the one or more altered files after applying the alteration in the file system.

Optionally, the program code comprises code instructions to update the resources dataset during one or more phases of one or more file operations executed to apply the alteration. The file operation phase is a member selected from a group consisting of prior to execution of the file operation, during execution of the file operations and/or following execution of the file operation.

The program code comprises code instructions to create the resources dataset during a mount sequence of the file system by analyzing each of the plurality of metadata records and the plurality of self-journal records.

Optionally, the resources dataset resides in a volatile memory comprising one or more volatile memory devices.

The program code comprises code instructions to execute a consistency check of the file system by analyzing each of the plurality of metadata records and each of the plurality of self-journal records to determine a successful completion of the alteration during a previous unmount sequence of the file system.

Based on the analysis, the alteration is applied in the file system in the event the alteration completed successfully prior to the unmount sequence.

Based on the analysis, the alteration is discarded and not applied in the file system in the event the alteration failed to complete prior to the unmount sequence.

Optionally, the program code comprises code instructions to create an alternate file system segment which is built in a reserved area of the file system in case the alteration inflicts a change in construction of one or more segments of the file system. The alternate file system segment is linked to one or more unaltered files contained in an original file system segment containing the one or more altered files.

The program code comprises code instructions to commit the alternate file system segment to the file system to replace the original file system segment by executing an atomic operation.

Optionally, the program code comprises code instructions to log the indication of the alteration in one or more other respective self-journal records associated with one or more linked files of the plurality of files which is linked to the one or more altered files.

Optionally, the direct mapped persistent memory unit comprises one or more power backed-up non-volatile dual in-line memory module (NVDIMM-N).

Optionally, the file system is hosted by one or more mass storage units for storing at least some of the plurality of files.

Optionally, the file system is constituted of one or more of a plurality of B-Trees.

According to some embodiments of the present invention there is provided a method creating, managing and/or maintaining for persistent memory based distributed-journal file system using one or more hardware processors for preforming the following:

Creating a resources dataset which maps a plurality of characteristics of a file system by analyzing a plurality of metadata records and a plurality of self-journal records each associated with one of a plurality of files contained in the file system. The plurality of metadata records and the plurality of self-journal records are stored in a direct mapped persistent memory.

Receiving an alteration request to alter one or more altered files of the plurality of files.

Determining if the alteration is an atomic alteration which may be applied in the file system in an atomic operation.

Recording an indication of the alteration in the respective self-journal record associated with the one or more altered file(s) in case the alteration is a non-atomic alteration.

Applying the alteration in the file system.

The indication is removed from the respective self-journal record of the one or more altered files after applying the alteration in the file system.

Optionally, the resources dataset is updated during one or more phases of one or more file operations executed to apply the alteration. The file operation phase is a member selected from a group consisting of prior to execution of the file operation, during execution of the file operations and/or following execution of the file operation.

The resources dataset is created during a mount sequence of the file system by analyzing each of the plurality of metadata records and the plurality of self-journal records.

A consistency check of the file system is executed by analyzing each of the plurality of metadata records and each of the plurality of self-journal records to determine the successful completion of the alteration during a previous unmount sequence of the file system:

Based on the analysis, the alteration is applied in the file system in the event the alteration completed successfully prior to the unmount sequence.

Based on the analysis, the alteration is discarded and not applied in the file system in the event the alteration failed to complete prior to the unmount sequence.

Optionally, an alternate file system segment is created in a reserved area of the file system in case the alteration inflicts a change in construction of one or more segments of the file system. The alternate file system segment is linked to one or more unaltered files contained in an original file system segment containing the one or more altered files.

The alternate file system segment is committed to the file system to replace the original file system segment by executing an atomic operation.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
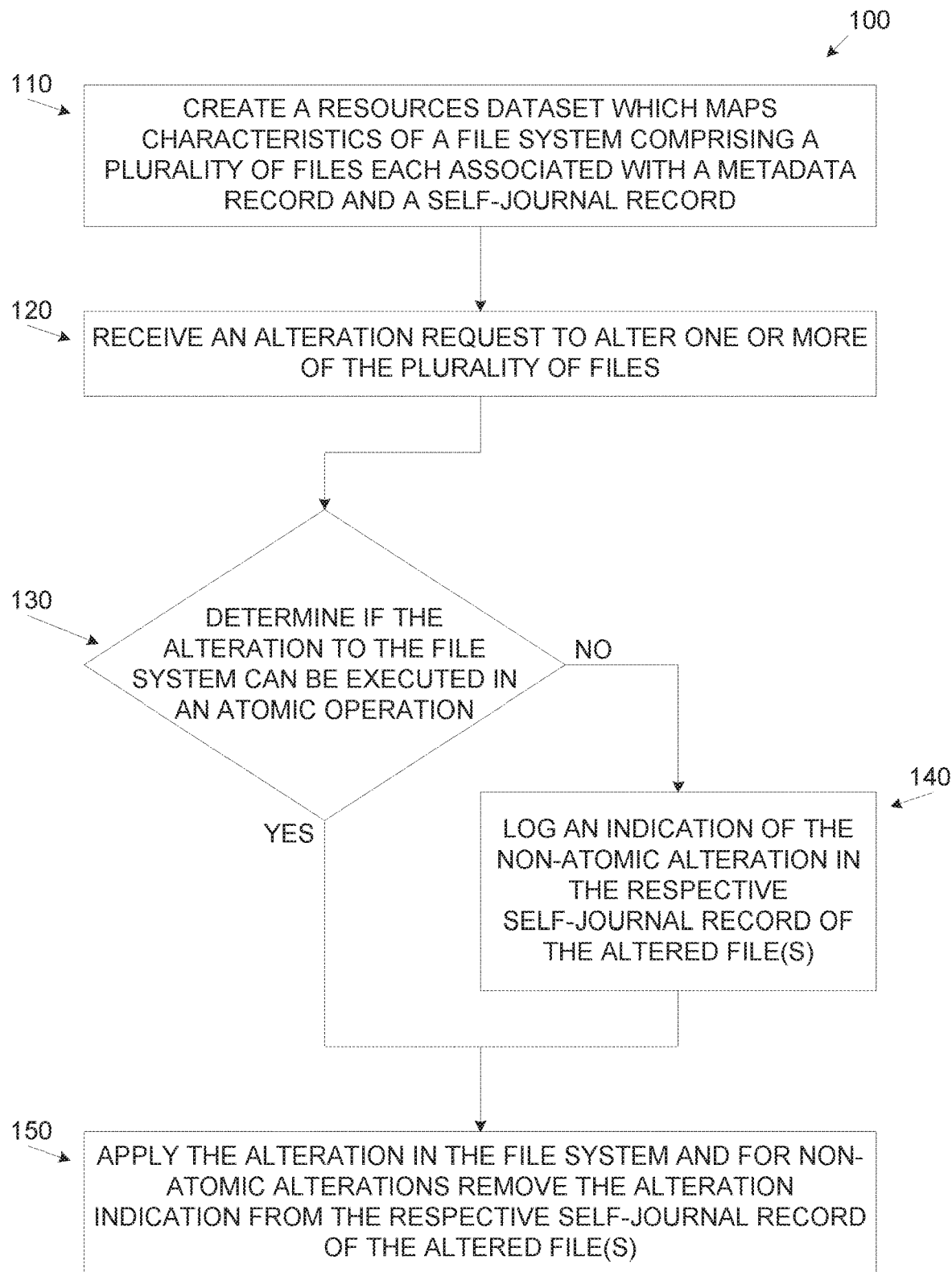
FIG. 1 is a flowchart of an exemplary process for creating a persistent memory based distributed-journal file system, according to some embodiments of the present invention.

The present invention, in some embodiments thereof, relates to creating a robust persistent memory based distributed-journal file system and, more specifically, but not exclusively, to creating a robust persistent memory based distributed-journal file system by allocating a self-journal record to each of the files in the file system.

According to some embodiments of the present invention, there are provided systems, methods and computer programs for creating a robust crash proof high performance distributed-journal file system on a persistent memory medium. The distributed-journal file system may take advantage of the persistent memory architecture which supports extremely high speed data access and direct memory mapping to perform most file system operations to one or more of a plurality of files contained in the distribute-journal file system, for example, a data file, a directory, a link to a data file and/or a link to a directory as an atomic uninterruptable operation in the distributed-journal file system. Applying the file operations in an atomic operation may significantly increase the performance and/or data access rates of the distributed-journal file system by avoiding for journal log recording for these file operation(s). The file operation types that do require logging journal records are few and their high performance is maintained by logging their journal records in self-journal records assigned to each of a plurality of files contained in the distributed-journal file system. The atomic operation as discussed hereinafter refers to an atomic file system operation in the context of POSIX.

Legacy file systems, such as, for example, journaled file system (JFS), new technology file system (NTFS), Linux extended filesystem (EXT3 and EXT4), XFS and/or ZFS hold a single global journal record for recording all alteration(s) and/or file operation(s) in the file system. For the legacy journaling file systems a sequential process may be required to update the global journal record with multiple file operations thus an operation to log a new journal entry in the global journal record may have to wait, pause and/or stall until the logging operation of a previous log entry completes. The distributed-journal file system on the other hand may increase journaling operations speed by allocating the self-journal record to each of the plurality of files to allow execution of multiple concurrent file operations to multiple files in the distributed-journal file system without blocking each other while logging journal records.

While providing extremely high performance and/or data access rates compared to the legacy journaling file systems the distributed-journal file system maintains high data integrity at all times, and specifically during improper unmounting of the distributed-journal file system as well as fast mounting time even following an improper unmounting. By maintaining the self-journal records, the distributed-journal file system may support a rapid mounting sequence even following an improper unmount sequence without hindering the mounting sequence compared to non-journaling file systems. The non-journaling file systems, for example, file allocation table (FAT) and/or second extended filesystem (EXT2) may need to execute a file system check (FSCK) operation to analyze all and/or most of the file system objects and/or the physical storage medium during the mounting sequence to resolve inconsistencies before allowing access to the file system. The FSCK process to return the non-journaling file system to a legal state may require extend time, possibly hours or even days to execute, which is the reason journaling is an important feature for most modern file systems such as, for example, NTFS (FAT successor) and ext3 (ext2 successor). The distributed-journal file system on the other hand may provide immediate access to the files in the file system during the mounting sequence, just like traditional journal-based file systems, without running FSCK beforehand but rather resolving possible inconsistencies in the background by analyzing the self-journal records.

The persistent memory medium hosting the distributed-journal file system is direct memory mapped supporting byte access and therefore supports extremely high-speed access in the magnitude of random access memory (RAM) volatile memory compared to several order of magnitude slower block-based non-volatile storage devices such as, for example, a solid state drives (SSD). Moreover since the persistent memory medium is accessed with fine granularity (typically byte or cache-line) the need for long coarse granularity operations, such as read block to volatile memory, then modify in volatile memory and then write back the entire block to non-volatile storage devices is avoided. Long operations are at risk of being improperly interrupted. The persistent memory medium may comprise one or more direct mapping persistent memory devices, for example, a persistent non-volatile dual in-line memory module (NVDIMM-N), a persistent non-volatile dual in-line memory module with Flash block access support (NVDIMM-P), a 3D XPoint™ module such as Intel Optane™, a resistive random access memory (ReRAM) module, a magneto-resistive random access memory (MRAM) module, a phase-change memory (PCM) module, another storage-class memory (SCM) based module and/or a battery backed-up high-speed memory module and/or a capacitor backed-up high-speed memory module.

The distributed-journal file system includes a plurality of file system objects the same as legacy file systems such as, for example, an inode which may store attributes and/or storage block location(s) of the file's data, a metadata record associated with each of the plurality of files and a resources dataset which maps various aspects of the distributed-journal file system and/or the storage medium hosting it and the plurality of files themselves. Each of the metadata records holds one or more information data items of the associated file, for example, a file creation time, a last file modification time, a file size, a file attribute and the likes. Metadata records, for example for directories typically hold additional information such as, for example, contained file names of child files and/or directories, inode numbers, access control list and/or other attributes. As discussed before each of the plurality of files in the distributed-journal file system is allocated with a self-journal record for logging intended file operation(s) to be performed over the associated file(s). The resources dataset which maps the plurality of aspects and/or characteristics of the distributed-journal file system and/or the persistent memory medium is created during every mount sequence of the distributed-journal file system by analyzing the metadata records and/or the self-journal records. The resources dataset may include, for example, free blocks, free inodes, free tree elements, link counts, and the likes.

Performance of the distributed-journal file system may be further increased by holding the resources dataset which is frequently accessed in high-speed volatile memory and designing it to recreate the resources dataset from scratch during every mount sequence of the distributed-journal file system. The resources dataset is created by analyzing the metadata records (e.g. inodes and directory content) and the self-journal records during the mounting sequence and since both the metadata records and the self-journal records are typically stored in the high-speed persistent memory, they may be rapidly retrieved and analyzed without hindering the mounting sequence.

The distributed-journal file system may receive one or more alteration requests to alter one or more of the plurality of files. The alteration requests may be received from one or more of a plurality of sources, for example, a system call, a function call and/or a remote service. The alteration(s) may include one or more of a plurality of file operations types, for example, modify, create, write, mmap, move, erase, delete, rename, link, unlink, merge, split, append, concatenate, truncate and/or attribute(s) change, i.e. every file operation to a file or directory is recorded in the associated self-journal record. Most of the file operations in the distributed-journal file system are atomic file operations which may be executed in an atomic manner which may not be interrupted by other operations to the distributed-journal file system while some of the file operations are non-atomic file operations. Determining and/or filtering which of the file operations are atomic or non-atomic is done based on the file operation type.

The benefit of filtering out file operations that may be executed atomically in the persistent-memory based distributed-journal file system, using such an efficient atomic and persistent tree is clear as journaling operations may be avoided thus reducing the overhead these journaling operations impose. For the file actions which may be executed in an atomic operation there is no need to log the intended file action in the self-journal record of the altered file(s) since once the intended file action is issued to the persistent memory mapped medium the alteration goes through and applied to the distributed file system even in case of, for example, a system crash, a system hang, an unclean shutdown and/or a power loss. Executing the non-atomic file operations in an atomic manner is supported by avoiding book keeping, i.e. management operations of the distributed-journal file system since the resources dataset is being re-created during every mount sequence of the distributed-journal file system. The atomic operation(s) may include one or more file operations and/or actions (sub-operations) which are not interruptible within the distributed-journal file system and may be fully re-played (re-done or un-done) in the event the atomic operation fails during its execution.

Some alterations and/or file operations which are non-atomic may not be applied into the distributed-journal file system in an atomic operation as they may require execution of multiple actions (sub-operations). The non-atomic alterations and/or file operations may require recording (logging) an indication of the intended file operation(s) in the respective self-record of the associated altered file(s). Updating the self-record may be essential to keep track of the progress of the intended file operation(s) which are in progress and specifically to recover the distributed-journal file system to a legal state following an improper unmount sequence of the distributed-journal file system during which one or more of the alterations and/or intended file operations are in progress. Additional respective self-journal records of one or more file(s) which are linked to the altered file(s) may be logged with an indication of the intended file operation(s), for example, a parent directory, a child directory, a source directory and/or a destination directory. After the intended file operation(s) is complete the indication of the respective intended file operation(s) (now complete) is removed from the self-journal record(s) associated with the altered file(s) and/or linked file(s).

Some alterations and/or file operations may impact the arrangement and/or construction of one or more segments of the distributed-journal file system, for example, change directory hierarchy, change directory arrangement and the likes. These alterations and/or file operations may include one or more intended file operations, for example, inserting file(s) and/or directory(s), moving file(s) and/or directory(s), truncating files, renaming file(s) and/or directory(s) and the likes. In order to apply these alterations and/or file operations in the distributed-journal file system as an atomic operation, one or more alternate file system segments may be created to replace one or more original file system segments which include the altered file(s). The alternate file system segment may be constructed in a reserved storage space of the storage medium hosting the distributed-journal file system. The alternate file system segment(s) are constructed to include one or more new structural elements needed to apply the intended file operation(s) while maintaining links to all other unaltered file(s) (data objects) which are included in the original file system segment(s) to duplicate the structural relationships of the original file system segment(s) with the exception of the altered file(s). Once the alternate file system segment(s) are fully constructed they are committed into the distributed-journal file system in an atomic operation. The atomic operation includes re-assigning a pointer which is currently pointing to the original file system segment(s) to point to the alternate file system segment(s) so that the alternate file system segment(s) now replace the original file system segment(s). The original file system segment is no longer available in the distributed-journal file system and its space may be reclaimed as free space. In other cases, when an improper unmount sequence occurred before the atomic change, the alternate file system segment(s) was not committed to be part of the distributed-journal file system and its space may be reclaimed as free space.

After the distributed-journal file system is updated with the alteration (an atomic alteration and/or non-atomic alteration), the resources dataset may be updated with the new state, attributes and or characteristics of the distributed-journal file system and/or the persistent memory medium following the alteration.

During every mounting sequence of the distributed-journal file system a consistency check is initiated to detect inconsistencies in the distributed-journal file system. The consistency check includes analysis of the metadata records and the self-journal records of all files in the distributed-journal file system. Inconsistencies are identified by analyzing the metadata records compared to the self-journal records of the files of the distributed-journal file system to determine successful completion of the alteration(s) and/or intended file operation(s) which may be logged in one or more of the self-journal record(s). Inconsistencies in the distributed-journal file system may result from improper unmounting during which one or more intended file operation(s) are in progress. The intended file operations which take place during the improper unmount sequence may not complete successfully thus leaving the distributed-journal file system in a non-deterministic state. The consistency check resolves the detected inconsistencies to bring the distributed-journal file system to a known and deterministic state.

The inconsistencies detected in the distributed-journal file system may be resolved by re-playing and/or completing the intended file operation(s). Re-playing the intended file operation(s) includes re-doing and/or un-doing the intended file operation(s). For example, intended file operation(s) which completed successfully prior to the improper unmount sequence while their indication in the self-journal record is not removed are re-done and committed properly to the distributed-journal file system. In the same manner intended file operation(s) which failed to complete prior to the improper unmount sequence are un-done (discarded) and the distributed-journal file system is restored to the state it was in prior to the failed intended file operation(s). As part of the re-play operation(s) the resources dataset may be updated to reflect the re-play operation(s) and/or the storage space of the failed file operation(s) may be reclaimed as free space. While some data and/or file operation(s) may be lost by discarding the failed intended file operation(s), the distributed-journal file system maintains its consistency and data integrity for all other files and file operation(s).

Optionally, while most of the metadata records and the self-journal records are maintained on the persistent memory medium, at least some of the distributed-journal file system files' contents may be stored in an additional non-volatile storage medium. The non-volatile storage medium may include one or more mass storage devices, for example, a magnetic hard disk drive (HDD), a solid state disk drive (SSD) and/or a similar target, shared array or service residing across a high-speed network or interconnect component.

Optionally, the files within the distributed-journal file system may be arranged in one or more of a plurality of structures, for example, a list, a linked list, a Tree, a binary Tree, a B-Tree, a B+Tree, a B*Tree and the likes to allow fast file and data unit add, delete, lookup and access actions.

The benefits of the distributed-journal file system compared to legacy journaling and non-journaling file systems are evident. The distributed-journal file system may greatly enhance data storage performance and/or data access rates while not compromising the data integrity of the stored data at all times, and specifically during an improper unmount sequence. The increased performance is achieved by the combination of the high concurrency of modern processors, the high data access rates of the emerging persistent memory medium, the efficient atomic and persistent data structure and the implementation of the filtered and distributed-journal file system, for example, the atomic operations, the concurrent journaling and/or the volatile nature of the resources dataset which is re-created during every mount sequence of the distributed-journal file system. Furthermore the self-journal record which is required for the non-atomic file operations, for example, rename and/or truncate operations may be incorporated and/or embedded in one or more of the distributed-journal file system, for example, an inode and/or a directory contents. The self-journal records of the truncate operation for example may be bound, i.e. limited to a small size which may allow embedding the self-journal record in, for example, the inode of the altered (truncated) file. The self-record of the rename operation on the other hand may not be bound in size and/or have a large size which may not allow embedding the self-journal record in the respective inode. The self-journal record for the rename operation may therefore be embedded in, for example, the contents of the parent directory which poses no size limitations.

The distributed-journal file system may be seamlessly integrated into any operating system (OS) since it maintains the same application programming interface (API), POSIX system calls and/or function calls as legacy file systems, thus making the transition to the distributed-journal file system transparent to the OS and/or to any one or more applications, utilities and/or program codes executing under the OS.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product.

Accordingly, aspects of the present invention may take the form of an entirely hardware embodiment, an entirely software embodiment (including firmware, resident software, micro-code, and the like) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, and the like, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a flowchart of an exemplary process for creating a persistent memory based distributed-journal file system, according to some embodiments of the present invention.

As shown at 110, a process 100 starts with mounting a distributed-journal file system in a persistent memory medium. The distributed-journal file system contains a plurality of files, for example, a data file, a directory, a link to a data file and/or a link to a directory which are arranged in one or more of a plurality of structures, for example, a list, a linked list, a B-Tree, a binary Tree, a B+Tree and/or another self-balancing Tree. Each of the plurality of files is associated with a metadata record and is allocated with an associated self-journal record stored in the persistent memory medium. The metadata records may hold one or more information items of the associated file, for example, a file creation time, a file modification time, a file size, a file attribute and the likes. The metadata records may further include one or more additional information items, for example, directory(s) hierarchy, links, file system structure elements arrangement, file names, directory names, inode numbers, access control list and other attributes. The self-journal records may each be incorporated and/or embedded within one or more file system objects, for example, the respective metadata record of the associated file, the respective inode, within the content of the parent directory of the associated file and/or within the content of an ancestor directory of the associated file. Moreover, the self-journal records may be incorporated and/or embedded differently for each of a plurality of altering file operations executed to alter one or more altered files. For example, for a specific type of altering file operation the self-journal record may be incorporated within the respective inode of the associated faltered file while for a different type of altering file operation, the self-journal record may be incorporated within the contents of the parent directory. The one or more file system objects in which the self-journal record is incorporated may depend on, for example, the type of the altering file operation and/or the size of the self-journal record as required by the altering file operation. By incorporating and/or embedding the self-journal record in existing file system object(s) no alteration is inflicted on the construction of any of the objects of the distributed-journal file system. The self-journal record may be bound, i.e. limited in size and in such case may be embedded within the inode of the associated file.

Optionally and/or alternatively in case the self-journal record is not bound in size it may be embedded within the contents of a parent directory of the associated file. Optionally, the self-journal records may be stored separately in the persistent memory medium.

A resources dataset is created to map a plurality of aspects and/or characteristics of the distributed-journal file system and/or the persistent memory medium, for example, free blocks, free inodes, free tree elements, link counts, and the likes. The resources dataset may further describe the arrangement of the plurality of structures constituting the distributed-journal file system and/or lists free and occupied segment(s) in the persistent memory medium. The resource dataset may also include tier queues and other one or more volatile metadata structures constituting the distributed-journal file system. The resource dataset which may typically be stored in relatively slow block-based storage media in legacy file systems may be stored in the high-speed volatile memory in the distributed-journal file system since it is re-created during every mount sequence of the distributed-journal file system as will be described herein after.

Figure 2:
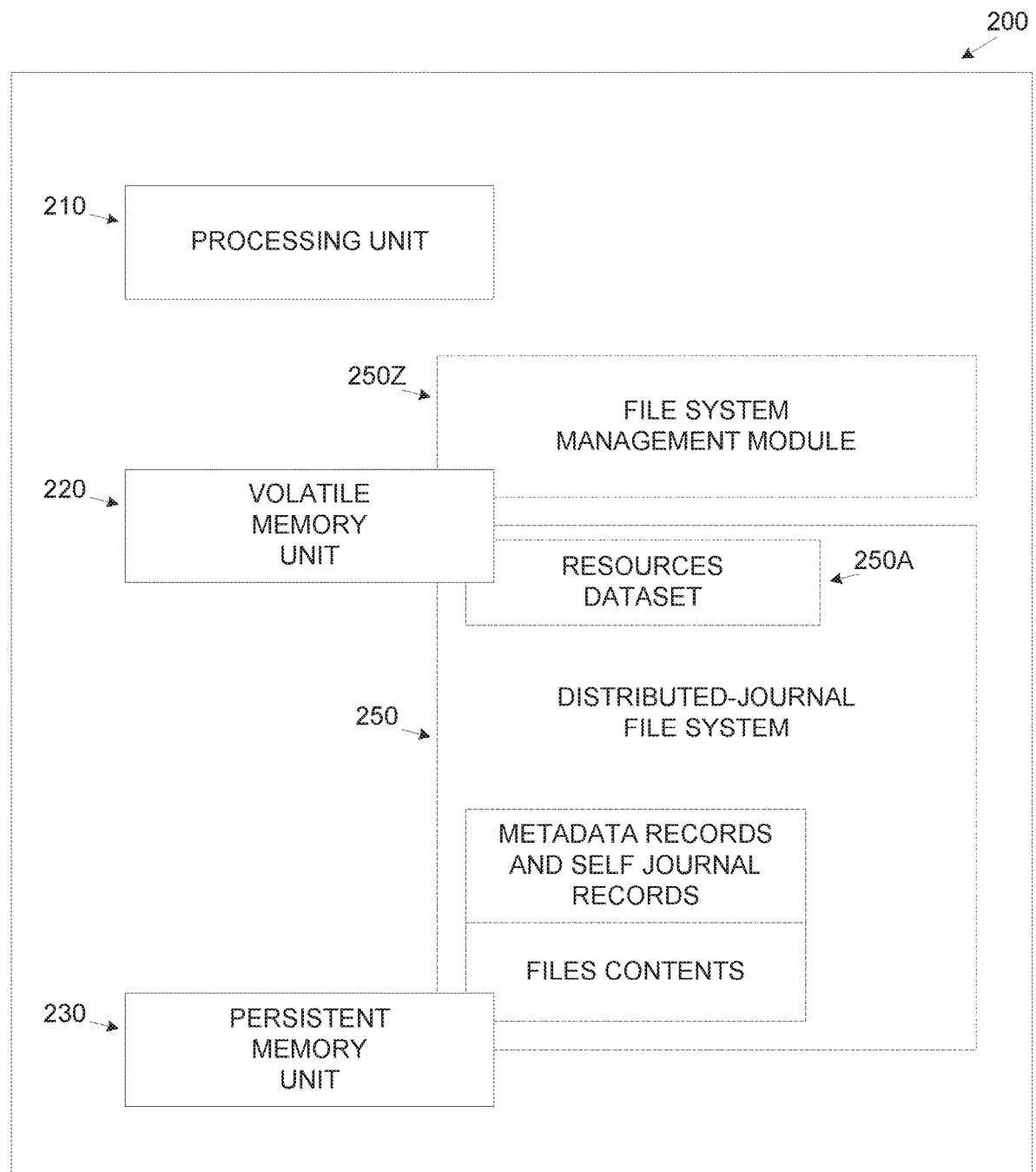
FIG. 2 is a schematic illustration of an exemplary persistent memory based distributed-journal file system, according to some embodiments of the present invention.

Reference is now made to FIG. 2 which is a schematic illustration of an exemplary persistent memory based distributed-journal file system, according to some embodiments of the present invention. A system 200 hosts a persistent memory based distributed-journal file system 250 which is created using a process such as the process 100. The system 200 includes a processing unit 210 comprising one or more processors, a high-speed volatile memory unit 220 and a persistent memory unit 230. The distributed-journal file system 250 includes a plurality of files each associated with a metadata record and a self-journal record stored in the persistent memory unit 230. The distributed-journal file system 250 includes a resources dataset 250A which may reside in the volatile memory 220. A file system management module 250Z, for example, a utility, an application and/or an OS service may create, manage and/or maintain the distributed-journal file system 250. Wherein a module refers to a plurality of program instructions stored in a non-transitory medium such as the for example, the persistent memory unit 230, another non-volatile device and/or a remote non-volatile device accessible over a network, and executed from the volatile memory unit 220 and/or the persistent memory unit 230 by the processing unit 210. The volatile memory unit 220 may include one or more memory devices, for example dynamic random access memory (DRAM) or persistent memory devices that are erased during every system boot in order to simulate DRAM volatile behavior and/or characteristics.

The persistent memory unit 230 includes one or more direct mapping persistent memory devices, for example, an NVDIMM-N module, an NVDIMM-P module, a storage-class memory module such as, for example, 3D-XPoint, a ReRAM module, an MRAM module, a battery backed-up high-speed memory module and/or a capacitor backed-up high-speed memory module.

Optionally, the system 200 includes an additional non-volatile storage unit for hosting at least some objects of the distributed-journal file system 250.

Figure 3:
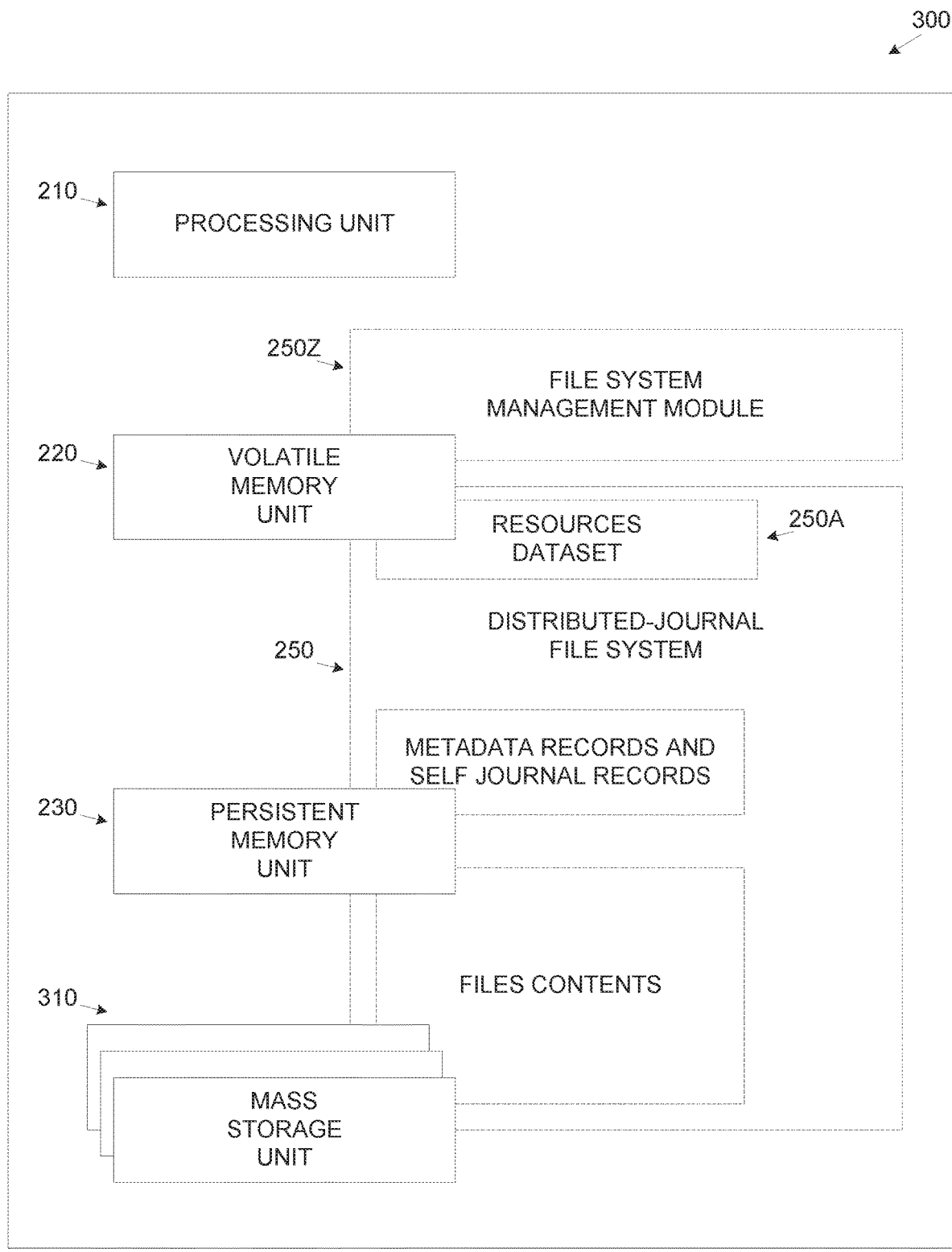
FIG. 3 is a schematic illustration of an exemplary persistent memory based distributed-journal file system with an additional mass storage unit, according to some embodiments of the present invention.

Reference is now made to FIG. 3 which is a schematic illustration of an exemplary persistent memory based distributed-journal file system with an additional mass storage unit, according to some embodiments of the present invention. The system 200 may be added with an additional mass storage unit 310 which may include one or more tiers of mass storage units which may each include one or more devices, for example, an SSD, an HDD, a peripheral component interconnect express (PCIe) memory module, a non-volatile memory express (NVMe) and the likes. Optionally, one or more tiers of the mass storage unit 310 include one or more network accessible devices and/or services, for example, an NVMe over fabric, a shared storage array, a high-speed remote direct memory access (RDMA) capable network target, a storage server, an OpenStack Cinder and/or an Amazon elastic block storage (EBS). While all and/or most of the metadata records and/or self-journal records of the distributed-journal file system 250 are stored in the persistent memory unit 230, the mass storage unit 310 may be used to store a subset consisting of at least some of the content of the data files of the distributed-journal file system 250. The subsets of file content which may be stored in the mass storage unit 310, are typically those which are accessed less frequently and/or not accessed recently and/or those hinted by the user may not require high-speed access which is available by the persistent memory unit 230. The mass storage unit 310 may include one or more tiers of storage, for example an NVMe-based storage for not-so-recently accessed file(s) and an HDD-based storage for rarely accessed file(s). Optionally, some of the metadata records and/or the self-journal records may also be stored in the mass storage unit 310, for example, metadata records and/or self-journal records of files which are very rarely accessed and/or have not been accessed recently.

Figure 4:
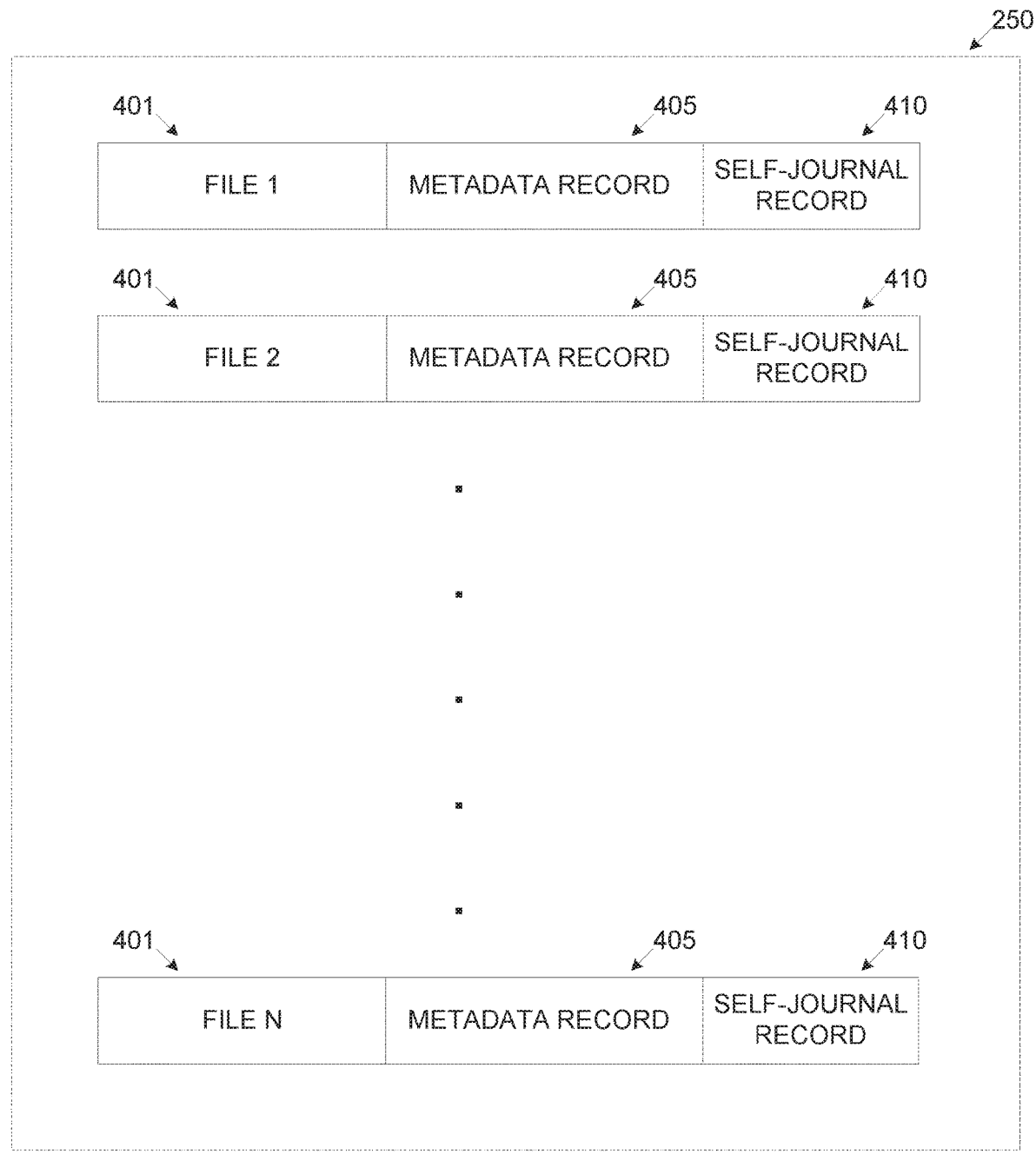
FIG. 4 is a schematic illustration of an exemplary file arrangement in an exemplary distributed-journal file system, according to some embodiments of the present invention.

Reference is now made to FIG. 4 which is a schematic illustration of exemplary file arrangement in an exemplary persistent memory based distributed-journal file system, according to some embodiments of the present invention. A file system management module such as the file system management module 250Z creates, maintains and/or manages a distributed-journal file system such as the distributed-journal file system 250. The distributed-journal file system 250 comprises a plurality of file system objects, for example, inodes, metadata records 405 and a plurality of files 401, for example, data files, links to data files, directories and links to directories. Each of the plurality of files 401 has an associated metadata record 405.

The content of the file(s) 401 may be arranged in one or more structures, for example, a B-Tree with leaves pointing to aligned data units/blocks. A self-journal record 410 is allocated for each of the files 401 for logging one or more file operations intended to be performed to the associated file 401. The self-journal record 410 allocated to the files 401 in one or more arrangements, for example, per file 401, per a subset of files 401, per a directory and/or per a storage unit, however each of the files 401 has an associated self-journal record 410. The metadata record 405 may include one or more of a plurality of file information items, for example, a file creation time, a last file modification time, a file size, a file attribute and the likes. Metadata records, for example for directories may hold additional information such as, for example, contained file names of child files and/or directories, inode numbers, access control list and/or other attributes. Optionally, the self-journal record 410 may be stored separately in the persistent memory 230. The self-journal records may each be incorporated within one or more of the file system objects, for example, the respective metadata record 405 of the associated file 401, the respective inode and/or within the content of the parent directory 401 of the associated file 401. By incorporating the self-journal record in existing file system object(s) no alteration is inflicted on the construction of any of the elements of the distributed-journal file system 250. In case the self-journal record 410 is bound, i.e. limited in size it may be embedded within the inode of the associated file 401. Optionally and/or alternatively in case the self-journal record 410 is not bound in size, or is bound in size but to a relatively high limit, it may be embedded within the contents of a parent directory 401 of the associated file 401. Optionally, the self-journal records 410 may be stored separately in the persistent memory medium 230.

Figure 5:
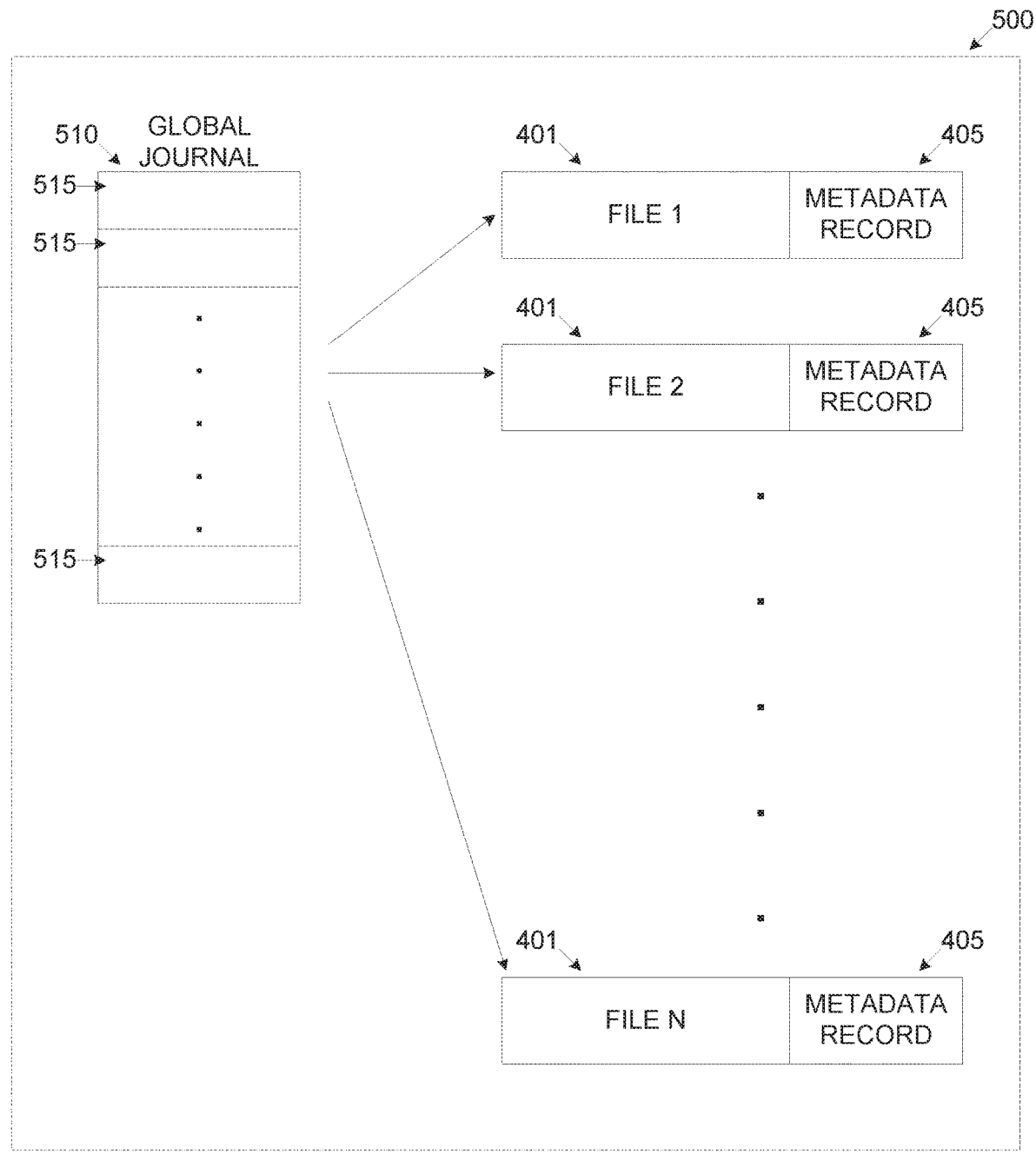
FIG. 5 is a schematic illustration of an exemplary file arrangement in an exemplary legacy journaling file system.

Reference is now made to FIG. 5 which is a schematic illustration of an exemplary file arrangement in an exemplary legacy journaling file system. For completeness there is presented an exemplary legacy journaling file system 500, for example, JFS, NTFS, ext3, XFS, ZFS and the likes. The legacy journaling file system 500 includes a plurality of files such as the files 401 each having a metadata record such as the metadata record 405. The legacy journaling file system 500 includes a single global journal record 510 which contains a plurality of log entries 515 for logging file operations performed to any of the files 401 included in the legacy journaling file system 500. Each of the log entries 515 is associated with file operation(s) performed to one or more of the files 401 of the legacy journaling file system 500.

Allocating the self-journal record 410 to each of the plurality of files 401 may greatly improve data access performance and/or increase data rate of the distributed-journal file system 250 compared to the legacy journaling file systems 500. The global journal record 510 may reduce the performance of the file system due to the sequential process required to serialize and update the global journal record 510. Recording a log entry 515 in the global journal record 515 for tracking one or more intended file operations within the legacy journaling file systems 500 may need to wait, pause and/or stall until a logging operation of a concurrent and/or a previous log entry 515 completes. The distributed-journal file system 250 as opposed to the legacy journaling file systems 500 may support multiple simultaneous operations to the plurality of files 401 without the logging operations blocking each other and without even actually having to journal most altering operation types.

Reference is made once again to FIG. 1. As shown at 120, the file system management module 250Z may receive alteration request(s) to alter one or more altered files 401 of the plurality of files 401 in the distributed-journal file system 250. The alteration request(s) may be received from one or more sources, for example, a system call, a function call, a thread, an application, a service, a user, and/or a remote session. The alteration request(s) may require execution of one or more intended file operations to the altered file(s), for example, modify, create, move, erase, delete, rename, link, unlink, merge, split, append, concatenate, truncate and/or attribute(s) change.

As show at 130 which is a decision point, the file system management module 250Z determines whether the requested intended file operation(s) may be applied the distributed-journal file system 250 in an atomic operation, i.e. an operation which is not interruptible by any other operation in the distributed-journal file system 250. Determining and/or filtering the file operations as atomic operations or non-atomic operations is done based on the file operation type. Atomic operations include, for example, modify, create, link, write, mmap, remove, delete, unlink, merge, split, append, concatenate and attribute change while non-atomic operations include, for example, truncate and/or rename. For requested alteration(s) which are atomic alteration(s), i.e. the required intended file action(s) may alter the altered file(s) 401 in an atomic operation the process 100 proceeds directly to step 150. For requested alteration(s) which are non-atomic alteration(s), i.e. the required intended file action(s) may not alter the altered file(s) 401 in an atomic operation the process 100 proceeds to step 140. The atomic operation is defined as atomic file system operation in the context of POSIX and may differ from traditional file systems. The atomic operation(s) may include one or more file operations and/or actions (sub-operations) which are not interruptible within the distributed-journal file system and may be fully re-played (re-done or un-done) in the event the atomic operation fails during its execution. As opposed to traditional file systems the scope of the atomic operation does not include file system book keeping, i.e. updating the resources dataset 250A to manage the storage space and/or the distributed-journal file system resources. The resources dataset 250A may not be updated as it is re-created during every mounting sequence of the distributed-journal file system 250 and may therefore be restored properly. By avoiding the book keeping together with applying some of the file operations through creation of an alternate file system segment (as presented hereinafter), most file operations to alter the altered files 401 include very few actions (sub-operations) which may be executed in an atomic manner and the execution flow of the process 100 proceeds directly to step 150.

As shown at 140, an indication of the intended file operation(s) is logged in the self-journal record 410 of the associated altered file(s) 401. Optionally, the indication is logged in one or more additional self-journal records 410 of one or more linked file(s) 410, for example, a parent directory, a child directory, an ancestor directory, a descendant directory, a source directory, a destination directory, a source file and/or a destination file. A rename file(s) operation, for example, may require updating the self-journal record 410 of the altered file(s) 401 as well as the parent directory(s) file(s) 401 of the altered file(s) 401.

As shown at 150, the intended file operation(s) are executed to apply the requested alteration in the distributed-journal file system 250. After completion of execution of the one or more file actions required to apply the requested alteration to distributed-journal file system 250, the alteration request is acknowledged. For atomic alterations which may be the absolute majority of alterations in the distributed-journal file system 250 the intended file operation(s) are executed in an atomic operation. The atomic operation may include, for example, updating the metadata record 405 of the associated altered file(s) 401 and/or updating the metadata record 405 of one or more parent directories of the altered file(s) 401. The atomic operation takes advantage of the architecture and characteristics of the persistent memory medium such as the persistent memory unit 230. Once the alteration operation, i.e. the intended file operation(s) are received at the persistent memory unit 230 the intended file operation(s) will complete and the requested alteration will be committed in the distributed-journal file system 250 with no regard to any external condition, for example, system crash, system hang, improper unmount sequence and/or power loss. The requested alteration will be committed to the distributed-journal file system 250 because:

No other operations to the distributed-journal file system 250 may interrupt the intended file operation(s) which apply the requested alteration thus no system crash, system hang and/or improper unmount sequence of the distributed-journal file system 250 may affect the completion of the intended file operation(s).

A power loss will not affect the persistent memory unit 230 as it is power backed-up and/or capacitor backed-up allowing the intended file operation(s) to properly complete even in the event of a power loss.

Non-atomic requested alteration(s), for example, truncate and/or rename may be performed in non-atomic manner, i.e. a sequence of two or more actions (sub-operation). The sequence of the actions may be interruptible and thus is susceptible to improper completion in the event of an improper unmounting of the distributed-journal file system 250 as result of, for example, system crash, system hang, unmount sequence and/or power loss.

While executing the intended file operation(s) to apply the requested alteration(s) as described in step 150, the file system management module 250Z may need to perform one or more file system management operations, for example, allocate storage space, release storage space and/or relocate storage space. The file system management operations may take place prior to execution of the intended file action(s), during execution of the intended file action(s) and/or following execution of the intended file action(s). The resources dataset 250A of the distributed-journal file system 250 may be updated to reflect the construction and/or contents of the distributed-journal file system 250 following the alteration, for example, new arrangement of one or more structures of the distributed-journal file system 250, newly occupied and/or free storage space segment(s) in the persistent memory unit 230 and/or the mass storage unit 310 and the likes. As part of updating the resources dataset 250A the storage space and/or storage segments of the persistent memory unit 230 and/or the mass storage unit 310 may be reclaimed to become free and available for use by the distributed-journal file system 250.

Some requested alteration(s) and/or the intended file operation(s) may require re-arrangement of one or more structures and/or segments of the distributed-journal file system 250. A special action may be required to apply such alteration(s) in an atomic operation while maintaining data integrity and/or consistency of the distributed-journal file system 250 at all time and specifically in the event of the improper unmount sequence. Applying such requested alteration(s) may require the file system management module 250Z to construct one or more alternate file system structures and/or file system segments in the background while keeping the original file system structure and/or segment unchanged and available for accessing any of the files contained in it. The alternate file system segment(s) may be constructed for example, in a reserved area of the distributed-journal file system 250 which is not accessible for other system calls, function calls, applications, threads, processes and/or services executed in the system 200. The reserved area may be used by the file system management module 250Z for one or more of a plurality of actions, for example, creating alternate file system segments, balancing, and/or maintenance activities. The alternate file system segment(s) may be manipulated to apply the requested alteration(s) and/or intended file operation(s), for example, create new inode(s) (file system object which represents data of a respective file, the metadata may be part of the inode), create new segment/structure element(s), merge segment/structure elements, split structure segment/element(s) and/or balance the structure. The alternate file system segment(s) is constructed so that it is linked to all unaltered (unchanged)

file(s) 401 which are contained in the original file system segment which includes the altered file(s) 401. Once fully constructed the alternate file system segment(s) may be committed into the distributed-journal file system 250 by executing an atomic operation comprising re-assignment of a pointer which originally pointed to the root of the original file systems segment(s) to now point to the root of the alternate file system segment(s). I.e. the original file system segment(s) is no longer available to the distributed-journal file system 250.

Optionally, the alternate file system segment is created as part of balancing operations to balance the one or more B-Tree structures constituting the distributed-journal file system 250. The alternate file system segment is committed into the distributed-journal file system 250 through an atomic operation after the alternate file system segment is fully constructed.

For non-atomic alteration(s), after the requested alteration(s) are applied to the distributed-journal file 250 system, i.e. the intended file operation(s) are completed, the indication of the intended file operation(s) (now complete) is removed from the respective self-journal record 410 associated with the altered file(s) 401. The indication of the intended file operation(s) is removed from the one or more respective self-journal record(s) 410 of the linked file(s), for example a parent directory file 401, in case the self-journal record(s) 410 of the linked file(s) was updated with the indication as presented in step 140.

During every mount sequence of the distributed-journal file system 250, the resources dataset 250A is re-created by analyzing the metadata records 405 and/or the self-journal records 410 of all files 401. Since most and/or all of the metadata records 405 and the self-journal records 410 are stored in the high-speed persistent memory unit 230 they may be rapidly accessed without hindering the mounting sequence of the distributed-journal file system 250. Because the resources dataset 250A which is frequently accessed by the file system management module 250Z is re-created during every mount sequence it may reside in the high-speed volatile memory to allow even higher access rates to further increase the performance of the distributed-journal file system 250.

Creation of the distributed-journal file system 250 may include going through one or more of the steps of the process 100 since the creation of the file system may involve execution of a plurality of file operations such as the atomic and/or non-atomic file operations.

As described before, in the event that the distributed-journal file system 250 is improperly unmounted while processing an atomic alteration(s) the state of the altered file(s) 401 is either the initial state or the final state which are both legal states for alteration request(s) that were not acknowledged. Restoring the altered file(s) 401 to one of the legal states is possible since the resources dataset 250A is re-created during every mount sequence of the distributed-journal file system 250. However the non-atomic alteration(s) may create an intermediate illegal state in the distributed-journal file system 250. The distributed-journal file system 250 may be restored to a legal state may be done by analyzing the self-journal records 410 of the altered file(s) 401.

During every mounting sequence the file system management module 250Z initiates a consistency check over the distributed-journal file system 250 to detect inconsistencies in the distributed-journal file system 250. The consistency check is done by analyzing the metadata records 405 and the self-journal records 410 of all files included in the distributed-journal file system 250 to detect files 401 that were tagged as journaled at the time of the improper unmounting sequence. These files 401 are the subset that is at risk of being in an illegal or inconsistent.

The inconsistencies detected in the distributed-journal file system 250 may be resolved by re-playing the alteration(s) and/or the intended file operation(s) as logged in the self-journal record(s) 410. In case the intended file operation(s) of the non-atomic alteration(s) completed successfully prior to the improper unmount, the intended file operation(s) are re-done, i.e. the alteration(s) and/or the intended file operation(s) are finalized, for example, remove the indication for the intended file operation(s) from the respective self-journal record(s) 410 of the altered file(s) 401 and/or updating the resources dataset 250A accordingly. The resources dataset 250A may be updated to reflect the alteration(s) to the distributed-journal file system 250 made by the successful file operation(s) which are finalized during the consistency check.

The intended file operation(s) associated with the non-atomic alteration(s) which failed to complete successfully prior and/or during the improper unmount are un-done, i.e. discarded and the distributed-journal file system 250 is brought to the state it was in prior to the failed file operation(s). The indication of the failed file operation(s) may be removed from the respective self-journal record(s) 410 of the altered file(s) 401 and/or the linked file(s) 401. The resources dataset 250A may be updated to reflect the restore distributed-journal file system 250.

Resolution of the inconsistencies in the distributed-journal file system 250 is essential to maintain consistency and/or data integrity of the distributed-journal file system 250. Even though some data and/or file operation(s) may be lost as result of discarding the failed intended file operation(s) and/or the alternate structure(s) created during the failed intended file operation(s), the distributed-journal file system 250 maintains its consistency and data integrity for all other files 401.

Using the persistent memory unit 230 to host the distributed-journal file system 250 may present multiple advantages as the distributed-journal file system 250 is designed and built to make full use of the persistent memory unit 230 architecture and/or characteristics. Naturally, the performance of the distributed-journal file system 250 is enhanced due to the extremely high data access rates of the persistent memory unit 230 compared to significantly slower non-volatile memory such as the mass storage unit 310. However the distributed-journal file system 250 takes further advantage of the high-speed data access features of the persistent memory 230, for example:

Performing most file operations as atomic operations thus avoiding the need for journaling operations which add significant overhead.

Maintaining the resources dataset 250A in the high-speed volatile memory unit 220 to further reduce access time during each access to the frequently accessed resources dataset 250.

Maintain a distributed journal by allocating a self-journal record 410 to each of the files 401 to allow simultaneous journaling operations.

Allow for a rapid mounting sequence of the distributed-journal file system 250 by quickly analyzing the metadata records 405 and optionally the self-journal records 410 during the mounting sequence. The distributed-journal file system 250 may be available for access from one or more system calls, function calls, services and/or sessions within a short period of time while inconsistencies in the distributed-journal file system 250 may be resolved in the background while the distributed-journal file system 250 is already mounted and available.

The performance and/or the data access rates of the distributed-journal file system 250 may be further increased by adapting one or more of its objects, for example, the self-journal records 410 and/or the metadata records 405 to best fit the architecture of the persistent memory unit 230 utilizing for example, one or more NVDIMM devices. The object(s) of the distributed-journal file system 250 may be further adapted to for the architecture of the processing unit 210. For example, the size of the self-journal records 410 and/or the metadata records 405 may be optimized for access width and/or cache line size of the processing unit 210 as well as the mapping granularity of the persistent memory unit 230.

As described before most of the intended file operations may be performed by the atomic operation in the distributed-journal file system 250. These file operations may include, for example, constructive file operation(s) and/or destructive file operations to alter one or more altered files 401. The constructive file operations may include, for example, create a file, create a directory, link a file and/or link a directory. The destructive file operations may include, for example, remove file, remove directory, unlink file and/or unlink directory. Some intended file operation(s) may not affect the structural arrangement of the distributed-journal file system 250 and may be simply applied in the distributed-journal file system 250 by updating the relevant linked file(s) 401. However other intended file operation(s) may inflict a change to the structural arrangement of the distributed-journal file system 250 and may be applied by creating the alternate file system segment(s) in the background to include and/or remove one or more altered file(s) 401. After the alternate file system segment(s) are fully created in the background a pointer which points to the original file system segment(s) is re-assigned through an atomic operation to point to the alternate file system segments thus committing it into the distributed-journal file system 250. Since the intended file operation(s) are applied through an atomic operation, once they are received at the persistent memory unit 230 they will complete with no regard to any improper unmount which may occur during execution of the intended file operation(s). As part of the creation of the resources dataset 250A during the following mounting sequence the respective metadata records 405 of the associated altered file(s) 401 and/or linked file(s) 401 are analyzed and the resources dataset 250A is updated to reflect the newly created file(s) 401.

However some file operations may not be performed in an atomic operation. Such file operations may include, for example, truncate and/or rename file operations.

The truncate file operation in which a certain data segment size is truncated from the end of a truncate data file 401. The truncate file operation may involve multiple actins (sub-operations), for example, remove multiple data units and/or block from the indicated point to the end of the data file 401. Since multiple actions may be required to apply the truncate file operation, the truncate file operation may not be applied in the distributed-journal file system 250 as the atomic operation. The intended truncate file operation is handled by first recording the intended truncate file operation in the respective self-journal record 410 of the truncated file 401, performing one or more actions (sub-operations), for example, data unit delete actions, updating the size of the truncated file 401 in the associated metadata record 405 and finally removing the record of the intended truncate file operation (now complete) from the respective self-journal record(s) 410 of the truncated file 401. Since the self-journal record 410 of the associated truncated file 401 is bound, i.e. limited in size it may be embedded in an existing object of the distributed-journal file system 250, for example, as a new field added within the respective inode of the truncated file 401 without altering the structure and/or size of the inode, the metadata record 405 and/or other objects of the distributed-journal file system 250. Meanwhile, the storage space freed by the deleted data units and indirect tree nodes of the original truncated file 401 may be reclaimed in during the truncate file operation, while additional storage resources may be allocated and potentially later freed in order to ensure the atomic and persistent nature of the data unit delete. In case an improper unmount occurs during execution the intended truncate file operation, as part of the consistency check during the following mounting sequence, the respective metadata record(s) 405 and the self-journal record(s) 410 of the associated truncated file(s) 401 are analyzed compared to the actual size of the truncated file(s) 401 to identify if the truncate file operation successfully completed. In case the size of the truncated file(s) 401 complies with the size indicated in the respective self-journal record(s) 410 the intended truncate file operation completed successfully. The record of the truncate file operation is removed from the respective self-journal record(s) 410 and the resources dataset 250A may be updated accordingly. In case the size of the truncated file(s) 401 does not comply with the size indicated in the respective metadata record 405 (i.e. it is larger) then the truncate operation to the file 401 may be re-played using the truncate size indicated in the self-journal record 410. The record of the truncate file operation is removed from the respective self-journal record 410 once the truncate operation is completed, so that the altered it may withstand any number of improper unmount sequences. The resources dataset 250A may be updated during the truncate file operation.

The rename file operation in which a renamed original file or directory 401 is renamed to have a different name—renamed new file 401 may not be applied in the distributed-journal file system 250 using an atomic operation. An alternate file system segment may be constructed to apply the changes to an original file system segment in which the renamed file 401 is created. The alternate file system segment may include one or more new file system objects, for example, a link to the parent directory file 401, new inode(s) and/or new structure element(s) which may be required to apply the changes of the intended rename file operation(s) The intended rename file operation(s) may be handled as follows:

- Record an intended remove operation in the respective self-journal record 410 of the parent directory 401 of the renamed original file 401.
- Find a renamed new file 401 which is to be renamed as the renamed original file 401 and to include the contents of the renamed original file 401. In case the renamed new file 401 does not exist it is created and linked as indicated by the rename file operation.
- Record an intended rename operation in the respective self-journal record 410 of the renamed new file 401.
- Remove the renamed original file 401 from its parent directory file 401.
- Remove the record of the intended rename operation from the respective self-journal record 410 of the renamed new file 401.

Restore all links (nlinks) to the renamed original file 401, the renamed new file 401 and the parent directory file 401 of both the renamed original file 401 and the renamed new file 401 to reflect the rename operation.

Since the self-journal record 410 of the associated rename file 401 is unbound, i.e. may not be limited in size or it is limited in size, but to a large size that may not be to pre-dedicated per metadata record 405 per file 401, the self-journal record 410 may be embedded in an existing object of the distributed-journal file system 250 which is not limited in size for example, within the parent directory 401 of the renamed original file 401 and/or the of the renamed new file 401 without altering the structure of the inode, the metadata record(s) 405 and/or other objects of the distributed-journal file system 250. In case an improper unmount occurs during execution the intended rename file operation(s), as part of the consistency check during the following mounting sequence, the respective metadata record 405 and the self-journal record 410 of the associated renamed original file 401, of the renamed new file 401, of the source parent directory file 401 and of the destination parent directory file 401 are analyzed to determine completion of the rename file operation(s). The rename file operation(s) is re-played to be re-done or un-done according to the state indicated by the respective self-journal records 410. The resources dataset 250A may be updated accordingly.

Figure 6:
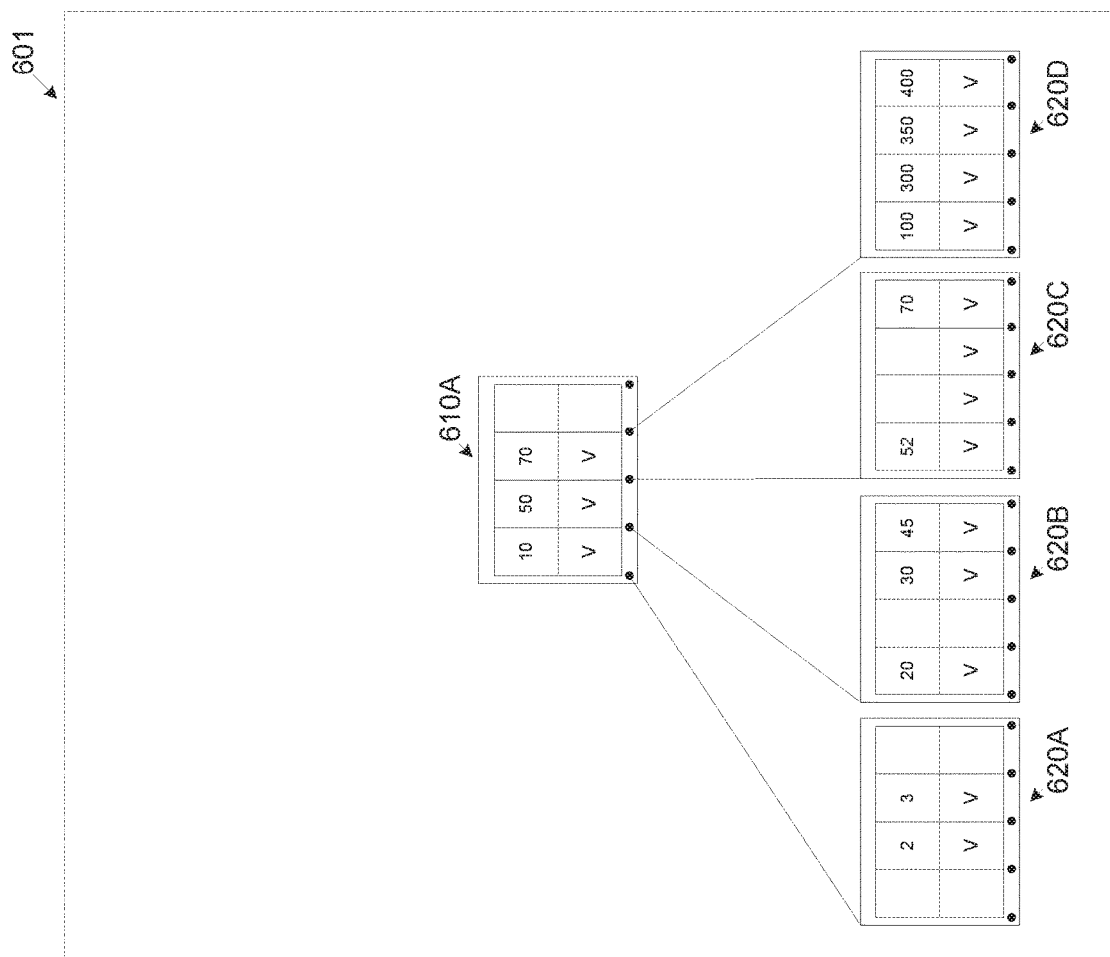
FIG. 6 is a schematic illustration of an exemplary B-Tree structure of an exemplary distributed-journal file system, according to some embodiments of the present invention.

Some embodiments of the present disclosure are provided through examples. However, this invention may be embodied in many different forms and should not be construed as limited to any specific structure or function presented herein. Reference is now made to FIG. 6 which is a schematic illustration of an exemplary B-Tree structure of an exemplary persistent memory based distributed-journal file system, according to some embodiments of the present invention. As discussed before a distributed-journal file system such as the distributed-journal file system 250 may be utilized through B-Tree structure(s), for example, an order-4 B-Tree 401 which may include a plurality of tree elements, for example, non-leaf elements (internal elements) 610 such as the non-leaf elements 610A and leaf elements (external elements) 620 such as the leaf elements 620A, 620B, 620C and/or 620D. As the B-Tree 601 employs order-4 architecture, each element may include 4 nodes (files) at most in which each node includes a key-value pair. The node value contains one or more data items stored in the node and the node key is a numeric value identifier used for file search, sort and/or access operations. The keys act as separation values which divide the B-Tree 601 to subtrees (branches) allowing file operations to propagate down the B-Tree 601 according to the keys values where moving to the left branch (subtree) of the B-Tree 601 will lead to nodes with key values lower than the key value of the parent node and moving to the right branch (subtree) of the B-Tree 601 will lead to nodes having key values higher than the key value of the parent node. As can be seen, the non-leaf element 610A, for example, includes 3 nodes identified with keys 10, 50 and 70 and each comprising a value field storing the one or more data items. The leaf element 620A, for example, includes nodes with key values (2 and 3) lower than the key value (10) of the left most node of the parent non-leaf element 610A. In the same manner, the leaf element 620B includes nodes with key values (20, 30 and 45) which are higher than the key value (10) of the left most node of the parent non-leaf element 610A and lower than the key value (50) of the next node of the parent non-leaf element 610A. The B-Tree structure may allow for efficient traverse through the tree elements 410A, 620A-620D during one or more file operations, for example, search, sort and/or access.

Balancing the B-Tree structure(s) may be performed by a file system management module such as the file system management module 250Z.

Figure 7:
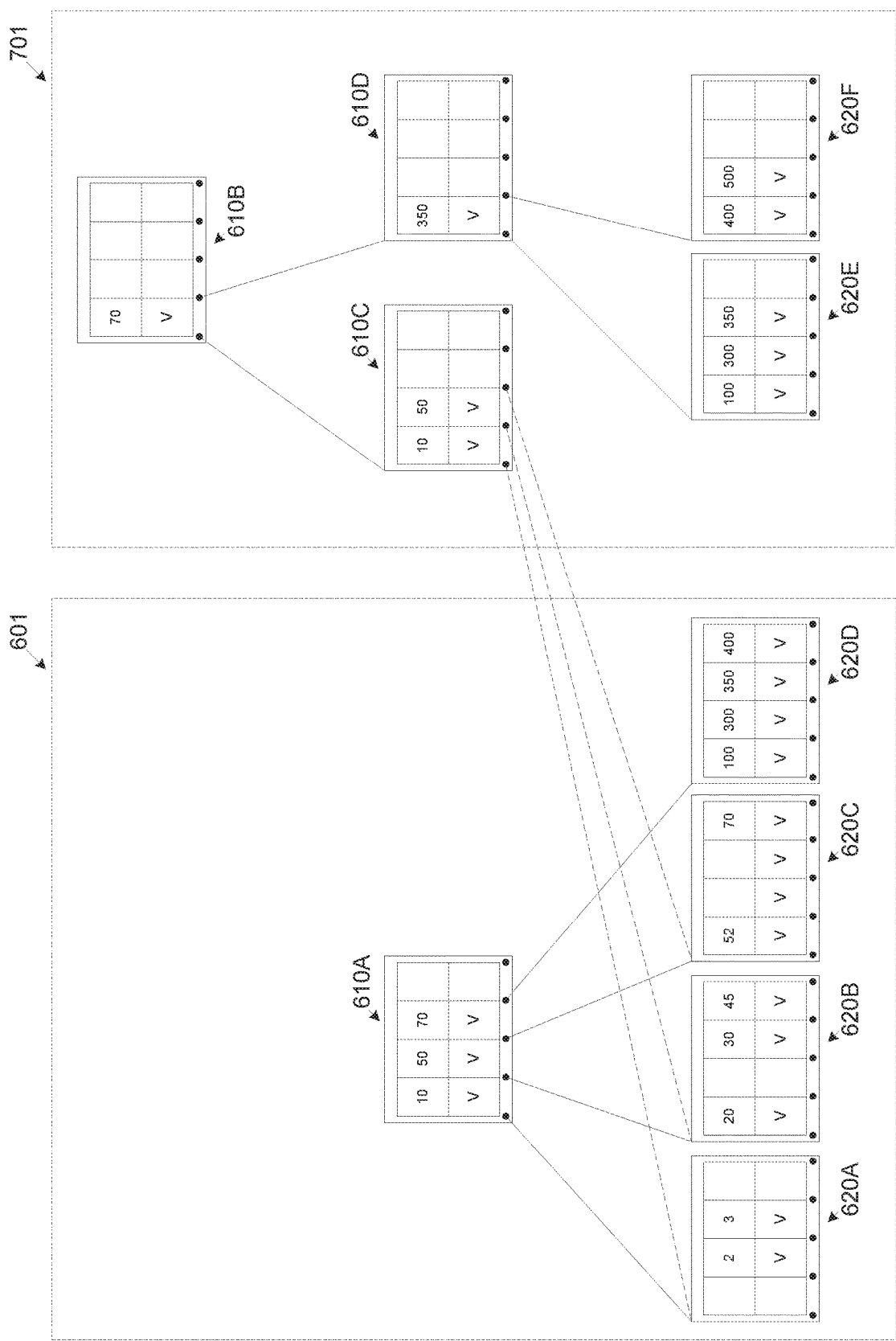
FIG. 7 is a schematic illustration of an exemplary alternate B-Tree construction for applying an insert operation in an exemplary distributed-journal file system, according to some embodiments of the present invention.

Reference is now made to FIG. 7 which is a schematic illustration of an exemplary alternate B-Tree construction for applying an insert file operation in an exemplary persistent memory based distributed-journal file system, according to some embodiments of the present invention. An exemplary insert file operation is performed to an original B-Tree such as the B-Tree 601 which may be one of one or more structures constituting a distributed-journal file system such as the distributed-journal file system 250. During the insert file operation, a new file (node) with key value 500 is intended to be inserted to the original B-Tree 601. As described in step 235 of the process 200 an alternate B-Tree 701 is created in the background in the reserved area to apply the one or more changes inflicted on the distributed-journal file system 250 by the insert file operation. Based on the arrangement of the original B-Tree 601, the inserted node (with key 500) should be included in the leaf element 620D. However the leaf element 620D is full as it already includes 4 nodes. As result the alternate B-Tree 701 is constructed to split the leaf element 620D to a leaf element 620E and 620F. Even though the leaf elements 620E and 620D may be added without further modifying the structure of the original B-Tree 601, for balancing purposes the structural arrangement of the alternate B-Tree 701 is modified. The top most non-leaf element 610A of the original B-Tree 601 is split to two levels which include a top most non-leaf element 610B and two middle level non-leaf elements 610C and 610D. The nodes of the original B-Tree 601 elements 610A and 620D are rearranged to balance the alternate B-Tree 701. Balancing the alternate B-Tree 701 may serve for optimizing traversing through the alternate B-Tree 701 during for example, search, sort and/or access operations. The B-Tree 701 is constructed to include only the new tree elements required to apply the insert file operation, i.e. the leaf elements 620A, 620B and 620C which are unaltered are not created in the alternate B-Tree 701 but are rather linked (through nlinks) to the alternate B-Tree 701 to duplicate the structural relationship of the original B-Tree 601.

Figure 8:
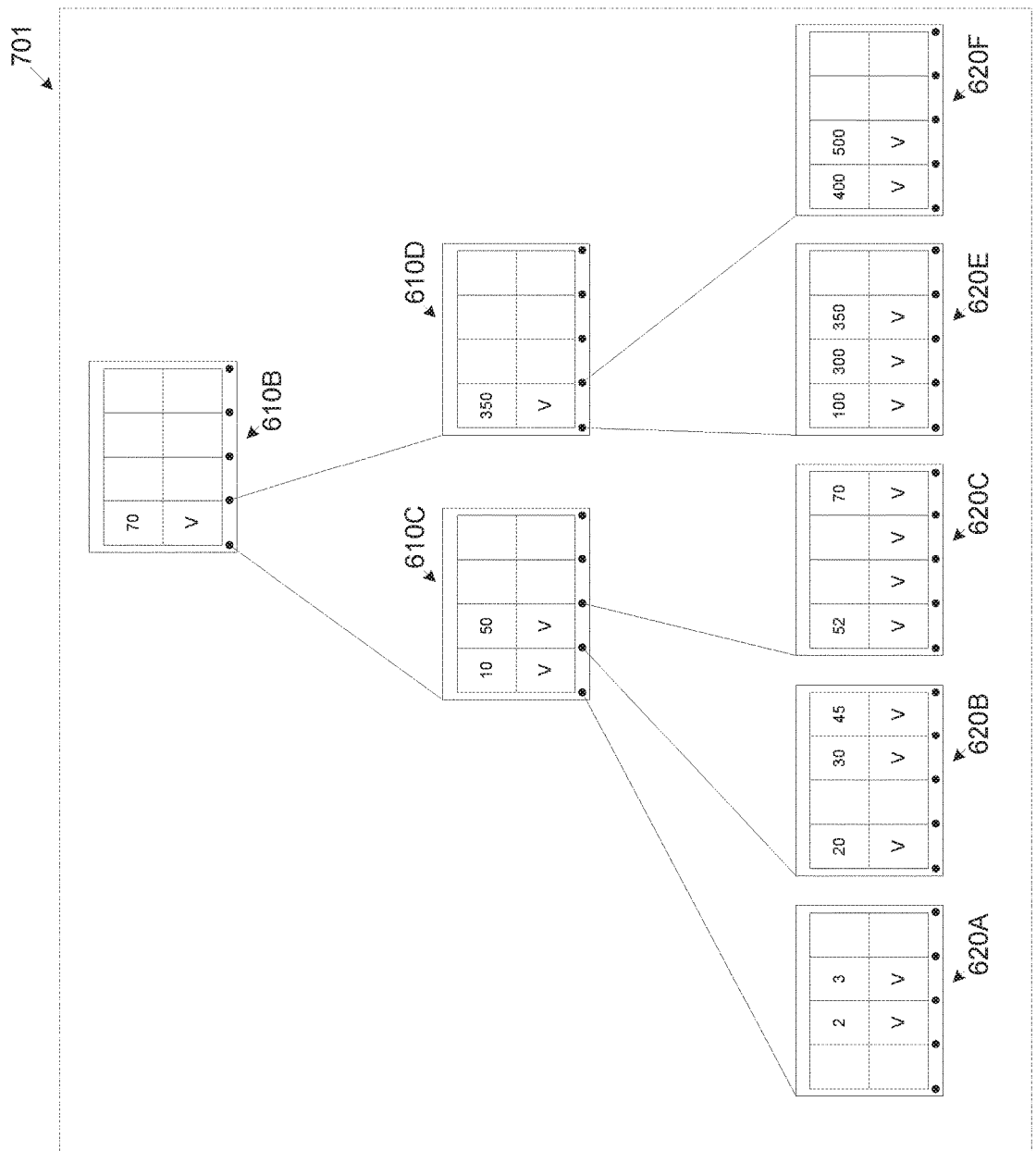
FIG. 8 is a schematic illustration of an exemplary alternate B-Tree committed to an exemplary distributed-journal file system following an insert operation, according to some embodiments of the present invention.

Reference is now made to FIG. 8 which is a schematic illustration of an exemplary alternate B-Tree committed an exemplary persistent memory based distributed-journal file system, according to some embodiments of the present invention. After completing construction of an alternate B-Tree such as the alternate B-Tree 701 the alternate B-Tree 701 may be committed into a distributed-journal file system such as the distributed-journal file system 250. A pointer which originally pointed to an original B-Tree structure such as the original B-Tree 601 is re-assigned to point to the alternate B-Tree 701. The pointer re-assignment is an atomic operation which may not be interrupting by any other file system operations. As result the alternate B-Tree 701 is now committed into the distributed-journal file system 250 and the original B-Tree 601 may be removed and its storage space may be reclaimed. The B-Tree 701 (no longer alternate) maintains all structural relations to the plurality of tree elements, 620A-620C as the original B-Tree 601 with the addition of the newly inserted node with key value 500.

Further detailed description of employing B-Tree structures for implementing atomic file operations in the distributed-journal file system 250 is described in the provisional application "METHOD FOR EFFICIENT, PERSISTENT AND ATOMIC UPDATE OF B-TREE IN A MEMORY-BASED FILE SYSTEM" by Amit Golander et al., whose disclosure is incorporated herein by reference.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method, comprising:

creating by a processor, a resources dataset with a plurality of structures for a persistent memory based, distributed-journal file system having a plurality of files, each file associated with a metadata and a self-journal record stored at a mapped persistent memory, wherein the mapped persistent memory hosts at least a portion of the file system to access the metadata and the self-journal record of each file by the file system from the persistent memory;

wherein the self-journal record tracks non-atomic alteration of an associated file and maintains an indicator only for incomplete non-atomic alterations, and the resources dataset provides an arrangement of the plurality of structures at the mapped persistent memory, and maps characteristics of the file system and the mapped persistent memory, based on a state of metadata and self-journal record during a first mount sequence for the file system;

determining by the processor, based on an alteration request to alter a first file that the alteration is based on a non-interruptible atomic operation or an interruptible non-atomic operation;

executing the non-interruptible atomic operation without updating a first self-journal record of the first file, upon determining that the alteration is based on the non-interruptible atomic operation;

recording by the processor, an indication of alteration in the first self-journal record of the first file, when the alteration is executed by the interruptible non-atomic operation, upon determining that the alteration is based on the interruptible non-atomic operation;

applying by the processor, the alteration in the file system;
removing by the processor, the indication from the first self-journal record upon successful completion of the interruptible non-atomic operation; and
recreating by the processor, the resources dataset during a second mount sequence of the file system using metadata and the first self-journal record of the altered first file.

2. The method of claim 1, wherein the self-journal record for each file is stored as part of the metadata record at the mapped persistent memory.

3. The method of claim 1, wherein the dataset resides in a volatile memory of a volatile memory device separate from the persistent memory.

4. The computer implemented method of claim 1, wherein a consistency check is executed during the second mount sequence to analyze each metadata record and self-journal record to determine a successful completion of the alteration during an unmount sequence of the file system.

5. The computer implemented method of claim 4, wherein based on said analysis said alteration is applied in said file system in the event said alteration completed successfully prior to the unmount sequence.

6. The computer implemented method of claim 1, wherein an alternate file system segment is created in a reserved area of said file system when the alteration changes a segment of the file system, said alternate file system segment linked to an unaltered file of an original segment of the file system.

7. The method of claim 6, wherein said alternate file system segment is committed to said file system to replace said original file system segment by executing an atomic operation.

8. The method of claim 4, wherein based on the analysis the alteration is discarded when the alteration failed to complete prior to the unmount sequence.

9. A non-transitory, machine readable storage medium having stored thereon instructions for performing a method, comprising machine executable code which when executed by at least one machine, causes the machine to:
create by a processor, a resources dataset with a plurality of structures for a persistent memory based, distributed-journal file system having a plurality of files, each file associated with a metadata and a self-journal record stored at a mapped persistent memory, wherein the mapped persistent memory hosts at least a portion of the file system to access the metadata and the self-journal record of each file by the file system from the persistent memory;
wherein the self-journal record tracks non-atomic alteration of an associated file and maintains an indicator only for incomplete non-atomic alterations, and the resources dataset provides an arrangement of the plurality of structures at the mapped persistent memory, and maps characteristics of the file system and the mapped persistent memory, based on a state of metadata and self-journal record during a first mount sequence for the file system;
determine by the processor, based on an alteration request to alter a first file that the alteration is based on a non-interruptible atomic operation or an interruptible non-atomic operation;
execute the non-interruptible atomic operation without updating a first self-journal record of the first file, upon determining that the alteration is based on the non-interruptible atomic operation;
record by the processor, an indication of alteration in the first self-journal record of the first file, when the alteration is executed by the interruptible non-atomic operation upon determining that the alteration is based on the interruptible non-atomic operation;
apply by the processor, the alteration in the file system;
remove by the processor, the indication from the first self-journal record upon successful completion of the interruptible non-atomic operation; and
recreate by the processor, the resources dataset during a second mount sequence of the file system using metadata and the first self-journal record of the altered first file.

10. The storage medium of claim 9, wherein the self-journal record for each file is stored as part of the metadata record at the mapped persistent memory.

11. The storage medium of claim 9, wherein the dataset resides in a volatile memory of a volatile memory device separate from the persistent memory.

12. The storage medium of claim 9, wherein a consistency check is executed during the second mount sequence to analyze each metadata record and self-journal record to determine a successful completion of the alteration during an unmount sequence of the file system.

13. The storage medium of claim 12, wherein based on said analysis said alteration is applied in said file system in the event said alteration completed successfully prior to the unmount sequence.

14. The storage medium of claim 9, wherein an alternate file system segment is created in a reserved area of said file system when the alteration changes a segment of the file system, said alternate file system segment linked to an unaltered file of an original segment of the file system.

15. The storage medium of claim 14, wherein said alternate file system segment is committed to said file system to replace said original file system segment by executing an atomic operation.

16. The storage medium of claim 12, wherein based on the analysis the alteration is discarded when the alteration failed to complete prior to the unmount sequence.

17. A system comprising: a memory containing machine readable medium comprising machine executable code having stored thereon instructions; and a processor coupled to the memory configured to execute the machine executable code to:
create a resources dataset with a plurality of structures for a persistent memory based, distributed-journal file system having a plurality of files, each file associated with a metadata and a self-journal record stored at a mapped persistent memory, wherein the mapped persistent memory hosts at least a portion of the file system to access the metadata and the self-journal record of each file by the file system from the persistent memory;
wherein the self-journal record tracks non-atomic alteration of an associated file and maintains an indicator only for incomplete non-atomic alterations, and the resources dataset provides an arrangement of the plurality of structures at the mapped persistent memory, and maps characteristics of the file system and the mapped persistent memory, based on a state of metadata and self-journal record during a first mount sequence for the file system
determine by the processor, based on an alteration request to alter a first file that the alteration is based on a non-interruptible atomic operation or an interruptible non-atomic operation;
execute the non-interruptible atomic operation without updating a first self-journal record of the first file, upon determining that the alteration is based on the non-interruptible atomic operation;

record by the processor, an indication of alteration in the first self-journal record of the first file, when the alteration is executed by the interruptible non-atomic operation upon determining that the alteration is based on the interruptible non-atomic operation;

apply by the processor, the alteration in the file system;

remove by the processor, the indication from the first self-journal record upon successful completion of the interruptible non-atomic operation; and recreate by the processor, the resources dataset during a second mount sequence of the file system using metadata and the first self-journal record of the altered first file.

18. The system of claim 17, wherein the self-journal record for each file is stored as part of the metadata record at the mapped persistent memory.

19. The system of claim 17, wherein the dataset resides in a volatile memory of a volatile memory device separate from the persistent memory.

20. The system of claim 17, wherein a consistency check is executed during the second mount sequence to analyze each metadata record and self-journal record to determine a successful completion of the alteration during an unmount sequence of the file system.

21. The system of claim 20, wherein based on said analysis said alteration is applied in said file system in the event said alteration completed successfully prior to the unmount sequence.

22. The system of claim 17, wherein an alternate file system segment is created in a reserved area of said file system when the alteration changes a segment of the file system, said alternate file system segment linked to an unaltered file of an original segment of the file system.

23. The system of claim 22, wherein said alternate file system segment is committed to said file system to replace said original file system segment by executing an atomic operation.

24. The system of claim 20, wherein based on the analysis the alteration is discarded when the alteration failed to complete prior to the unmount sequence.

* * * * *